Dec. 1, 1925.

J. M. REID

SIGNALING DEVICE

Filed Feb. 3, 1923

1,563,790

INVENTOR
J. M. Reid
By
ATTORNEYS

Patented Dec. 1, 1925.

1,563,790

UNITED STATES PATENT OFFICE.

JESSE MITCHELL REID, OF PULLMAN, WASHINGTON.

SIGNALING DEVICE.

Application filed February 3, 1923. Serial No. 616,771.

*To all whom it may concern:*

Be it known that I, JESSE MITCHELL REID, a citizen of the United States, and a resident of Pullman, county of Whitman, State of Washington, have invented a new and useful Signaling Device, of which the following is a specification.

The present invention relates to improvements in signaling devices adapted to be used for motor vehicles to indicate to drivers of other machines or pedestrians when a motor vehicle is going to slow down or stop or to turn to the right or left. The principal advantages of my device are that the same is very simple in its construction, that it is positive in action and within sight of the driver so that the latter can always make sure that it is in the proper position.

Figure 1:
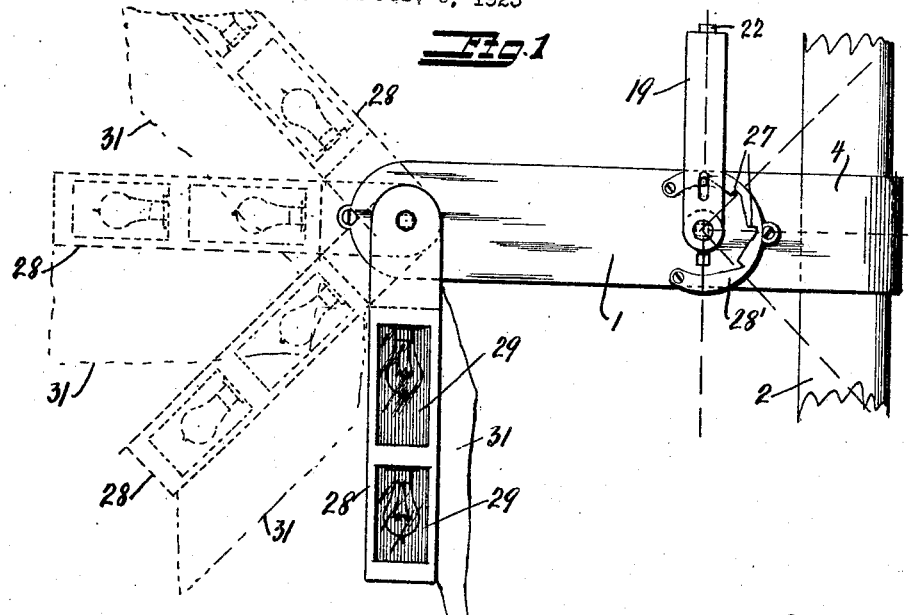
Figure 2:
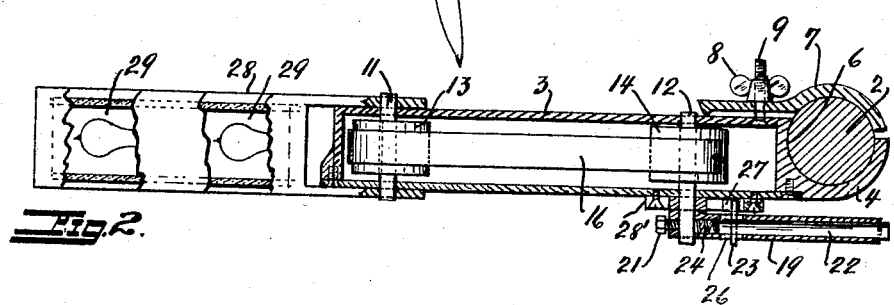
Figure 3:
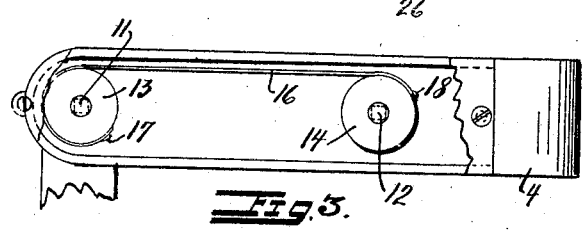

The preferred form of the invention is illustrated in the accompanying drawing in which Figure 1 shows a rear view of the same, Figure 2 a horizontal section through the same, and Figure 3 a rear view of a portion of the device with a cover plate removed so as to disclose the interior. While I have shown only the preferred form of the invention it should be understood that various changes or modifications may be made within the scope of the claim hereto attached without departing from the spirit of the invention. It should also be understood that although the device is shown in the drawing as being connected to the frame of the windshield it might be supported in any other suitable manner.

My signaling device comprises an arm (1) extending in horizontal direction from any suitable support such as the frame (2) for the windshield, only partly shown in the drawing. This arm consists preferably of a rectangular case (3) terminating at its inner end in a projection (4) forming a recess (6) adapted to cooperate with a clamping member (7) in securing the arm to the frame member (2), a wing nut (8) threadedly engaging a stud (9) emanating from the case to clamp the two cooperating members together.

In the case are supported in spaced and parallel relation to one another two shafts (11) and (12) having the drums (13) and (14) fixed thereto. A belt (16) is secured to the two drums as shown at (17) and (18) so as to allow of limited rotary motion of both drums in the same direction.

The shaft (12) supporting the drum (14) extends beyond the case (3) and has outside of the case a tube (19) secured thereto, the tube being held in place by the set screw (21) and extending from the shaft in radial direction so as to form an arm by means of which the shaft (12) may be rotated. A plunger (22) within the tube has a transverse pin (23) secured in its lower end, a spring (24) tending to force the plunger outwardly and slots (26) within the tube allowing of limited sliding motion of the pin (23). Normally the spring forces the extreme end of the plunger outside of the tube and when the plunger is in this position the pin (23) engages with one of a plurality of recesses (27) provided in a sector (28') arranged coaxially with the shaft (12). To cause the shaft to rotate it is necessary therefore to depress the plunger in order to clear the pin (23) from the recess (27) with which it may be engaged.

The shaft (11) at the other end of the arm (1) has a light housing (28) secured thereto as shown in the drawing. The light housing preferably is of rectangular form and comprises several compartments (29) closed preferably by colored glass. It also is provided with a flag (31) which makes any signal given more conspicuous at daytime.

The operation of the device will be readily understood from the foregoing description. As long as the light housing hangs in a perpendicular position as shown in full lines in Figure 1 no signal is given. If the driver intends to slow down or stop he actuates the arm (19) by pushing in the plunger and rotating it through a quarter of a turn. This rotary motion will be transmitted through the drums (17) and (18) and the belt (16) to the light housing (28) and the latter will be swung into the first dotted line position. To indicate that he wants to turn to the left the driver would in a similar manner swing the light housing into a horizontal position and to indicate a right-hand turn he would swing it still higher into the raised position shown in Figure 1. The meaning of the various signals of course could be changed and a certain code could be generally adopted.

I claim:

In a vehicle signaling device, a bracket arm having one end adapted to be fixedly secured to the vehicle in such position as to extend outwardly therefrom, an operating shaft rotatably mounted adjacent to the connected end of the arm, a signal carrying shaft journalled adjacent to the outer free end of the arm, pulleys on said shafts, and an endless belt connecting said pulleys.

JESSE MITCHELL REID.